United States Patent
de la Iglesia et al.

(10) Patent No.: US 8,656,039 B2
(45) Date of Patent: Feb. 18, 2014

(54) RULE PARSER

(75) Inventors: Erik de la Iglesia, Mountain View, CA (US); William Deninger, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 3508 days.

(21) Appl. No.: 10/864,153

(22) Filed: Jun. 8, 2004

(65) Prior Publication Data

US 2005/0132034 A1 Jun. 16, 2005

Related U.S. Application Data

(60) Provisional application No. 60/528,642, filed on Dec. 10, 2003.

(51) Int. Cl.
*G06F 15/16* (2006.01)
*G06F 11/00* (2006.01)

(52) U.S. Cl.
USPC ............................................. 709/231; 726/22

(58) Field of Classification Search
USPC ................... 709/231–233; 726/11–14, 22–26
See application file for complete search history.

(56) References Cited

U.S. PATENT DOCUMENTS

| | | |
|---|---|---|
| 4,286,255 A | 8/1981 | Siy |
| 4,710,957 A | 12/1987 | Bocci et al. |
| 5,249,289 A | 9/1993 | Thamm et al. |
| 5,465,299 A | 11/1995 | Matsumoto et al. |
| 5,479,654 A | 12/1995 | Squibb |
| 5,497,489 A | 3/1996 | Menne |
| 5,542,090 A | 7/1996 | Henderson et al. |
| 5,557,747 A * | 9/1996 | Rogers et al. .................. 709/223 |
| 5,623,652 A | 4/1997 | Vora et al. |
| 5,768,578 A | 6/1998 | Kirk |
| 5,781,629 A | 7/1998 | Haber et al. |
| 5,787,232 A | 7/1998 | Greiner et al. |
| 5,794,052 A | 8/1998 | Harding |
| 5,813,009 A | 9/1998 | Johnson et al. |

(Continued)

FOREIGN PATENT DOCUMENTS

| | | |
|---|---|---|
| EP | 2499806 | 9/2012 |
| WO | WO 2004/008310 | 1/2004 |
| WO | WO 2012/060892 | 5/2012 |

OTHER PUBLICATIONS

Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, printed Mar. 12, 2009.

(Continued)

*Primary Examiner* — Chirag R Patel
(74) *Attorney, Agent, or Firm* — Patent Capital Group

(57) ABSTRACT

In one embodiment of the present invention, a rule compiler can compress a plurality of rules to be parsed over a block of data into one state table tree structure. In one embodiment of the present invention, rue parsing over the block of data includes selecting a unit of the block of data, indexing into a state table of the state table tree using the selected unit. The state table indexed into can be used for determining whether a decision regarding the block of data can be reached based on the indexed entry, and for selecting a next state table indicated by the indexed entry if the decision regarding the block of data cannot be reached.

24 Claims, 10 Drawing Sheets

(56) References Cited

U.S. PATENT DOCUMENTS

| | | |
|---|---|---|
| 5,873,081 A | 2/1999 | Harel |
| 5,924,096 A | 7/1999 | Draper et al. |
| 5,937,422 A | 8/1999 | Nelson et al. |
| 5,943,670 A | 8/1999 | Prager |
| 5,987,610 A | 11/1999 | Franczek et al. |
| 5,995,111 A * | 11/1999 | Morioka et al. ............ 345/592 |
| 6,026,411 A | 2/2000 | Delp |
| 6,073,142 A | 6/2000 | Geiger et al. |
| 6,078,953 A | 6/2000 | Vaid et al. |
| 6,094,531 A | 7/2000 | Allison et al. |
| 6,108,697 A | 8/2000 | Raymond et al. |
| 6,122,379 A | 9/2000 | Barbir |
| 6,161,102 A | 12/2000 | Yanagihara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 * | 9/2001 | Richards ....................... 715/201 |
| 6,336,186 B1 | 1/2002 | Dyksterhouse et al. |
| 6,343,376 B1 | 1/2002 | Saxe et al. |
| 6,356,885 B2 * | 3/2002 | Ross et al. ....................... 706/45 |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 | 6/2002 | Bharat et al. |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 * | 5/2003 | Dong et al. .................... 709/209 |
| 6,584,458 B1 | 6/2003 | Millett et al. |
| 6,598,033 B2 * | 7/2003 | Ross et al. ....................... 706/46 |
| 6,629,097 B1 | 9/2003 | Keith |
| 6,662,176 B2 | 12/2003 | Brunet et al. |
| 6,665,662 B1 | 12/2003 | Kirkwood et al. |
| 6,675,159 B1 | 1/2004 | Lin et al. |
| 6,691,209 B1 | 2/2004 | O'Connell |
| 6,754,647 B1 | 6/2004 | Tackett et al. |
| 6,757,646 B2 | 6/2004 | Marchisio |
| 6,771,595 B1 | 8/2004 | Gilbert et al. |
| 6,772,214 B1 * | 8/2004 | McClain et al. ............. 709/229 |
| 6,785,815 B1 | 8/2004 | Serret-Avila et al. |
| 6,804,627 B1 | 10/2004 | Marokhovsky et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,976,053 B1 | 12/2005 | Tripp et al. |
| 6,978,297 B1 | 12/2005 | Piersol |
| 6,978,367 B1 | 12/2005 | Hind et al. |
| 7,007,020 B1 | 2/2006 | Chen et al. |
| 7,020,654 B1 | 3/2006 | Najmi |
| 7,020,661 B1 | 3/2006 | Cruanes et al. |
| 7,062,572 B1 | 6/2006 | Hampton |
| 7,062,705 B1 | 6/2006 | Kirkwood et al. |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,103,607 B1 | 9/2006 | Kirkwood et al. |
| 7,130,587 B2 | 10/2006 | Hikokubo et al. |
| 7,133,400 B1 * | 11/2006 | Henderson et al. ............ 370/389 |
| 7,139,973 B1 | 11/2006 | Kirkwood et al. |
| 7,143,109 B2 | 11/2006 | Nagral et al. |
| 7,158,983 B2 | 1/2007 | Willse et al. |
| 7,185,073 B1 | 2/2007 | Gai et al. |
| 7,185,192 B1 | 2/2007 | Kahn |
| 7,194,483 B1 | 3/2007 | Mohan et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 * | 8/2007 | Hsu et al. ....................... 705/77 |
| 7,254,632 B2 | 8/2007 | Zeira et al. |
| 7,266,845 B2 | 9/2007 | Hypponen |
| 7,272,724 B2 | 9/2007 | Tarbotton et al. |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 | 11/2007 | Brook et al. |
| 7,296,011 B2 | 11/2007 | Chaudhuri et al. |
| 7,296,070 B2 * | 11/2007 | Sweeney et al. ............. 709/224 |
| 7,296,088 B1 | 11/2007 | Padmanabhan et al. |
| 7,296,232 B1 | 11/2007 | Burdick et al. |
| 7,299,277 B1 | 11/2007 | Moran et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,467,202 B2 | 12/2008 | Savchuk |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 * | 3/2009 | McClain et al. ............. 709/225 |
| 7,506,155 B1 | 3/2009 | Stewart et al. |
| 7,509,677 B2 | 3/2009 | Saurabh et al. |
| 7,516,492 B1 | 4/2009 | Nisbet et al. |
| 7,539,683 B1 | 5/2009 | Satoh et al. |
| 7,551,629 B2 | 6/2009 | Chen et al. |
| 7,577,154 B1 | 8/2009 | Yung et al. |
| 7,581,059 B2 | 8/2009 | Gupta et al. |
| 7,596,571 B2 | 9/2009 | Sifry |
| 7,599,844 B2 | 10/2009 | King et al. |
| 7,664,083 B1 | 2/2010 | Cermak et al. |
| 7,685,254 B2 | 3/2010 | Pandya |
| 7,730,011 B1 | 6/2010 | Deninger et al. |
| 7,739,080 B1 | 6/2010 | Beck et al. |
| 7,760,730 B2 | 7/2010 | Goldschmidt et al. |
| 7,760,769 B1 | 7/2010 | Lovett et al. |
| 7,774,604 B2 | 8/2010 | Lowe et al. |
| 7,814,327 B2 | 10/2010 | Ahuja et al. |
| 7,818,326 B2 | 10/2010 | Deninger et al. |
| 7,844,582 B1 | 11/2010 | Arbilla et al. |
| 7,849,065 B2 | 12/2010 | Kamani et al. |
| 7,899,828 B2 | 3/2011 | de la Iglesia et al. |
| 7,907,608 B2 | 3/2011 | Liu et al. |
| 7,921,072 B2 | 4/2011 | Bohannon et al. |
| 7,930,540 B2 | 4/2011 | Ahuja et al. |
| 7,949,849 B2 | 5/2011 | Lowe et al. |
| 7,958,227 B2 | 6/2011 | Ahuja et al. |
| 7,962,591 B2 | 6/2011 | Deninger et al. |
| 7,984,175 B2 * | 7/2011 | de la Iglesia et al. ......... 709/231 |
| 7,996,373 B1 | 8/2011 | Zoppas et al. |
| 8,005,863 B2 | 8/2011 | de la Iglesia et al. |
| 8,010,689 B2 | 8/2011 | Deninger et al. |
| 8,055,601 B2 | 11/2011 | Pandya |
| 8,166,307 B2 | 4/2012 | Ahuja et al. |
| 8,176,049 B2 | 5/2012 | Deninger et al. |
| 8,200,026 B2 | 6/2012 | Deninger et al. |
| 8,205,242 B2 | 6/2012 | Liu et al. |
| 8,271,794 B2 | 9/2012 | Lowe et al. |
| 8,301,635 B2 | 10/2012 | de la Iglesia et al. |
| 8,307,007 B2 | 11/2012 | de la Iglesia et al. |
| 8,307,206 B2 | 11/2012 | Ahuja et al. |
| 8,463,800 B2 | 6/2013 | Deninger et al. |
| 8,473,442 B1 | 6/2013 | Deninger et al. |
| 8,504,537 B2 | 8/2013 | de la Iglesia et al. |
| 2001/0013024 A1 | 8/2001 | Takahashi et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0032772 A1 | 3/2002 | Olstad et al. |
| 2002/0046221 A1 | 4/2002 | Wallace et al. |
| 2002/0052896 A1 | 5/2002 | Streit et al. |

(56) References Cited

U.S. PATENT DOCUMENTS

| | | |
|---|---|---|
| 2002/0065956 A1 | 5/2002 | Yagawa et al. |
| 2002/0078355 A1 | 6/2002 | Samar |
| 2002/0091579 A1* | 7/2002 | Yehia et al. ............... 705/26 |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0128903 A1 | 9/2002 | Kernahan |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1* | 3/2003 | Duckett et al. ............. 370/252 |
| 2003/0055962 A1 | 3/2003 | Freund et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105716 A1 | 6/2003 | Sutton et al. |
| 2003/0105739 A1 | 6/2003 | Essafi et al. |
| 2003/0105854 A1 | 6/2003 | Thorsteinsson et al. |
| 2003/0131116 A1* | 7/2003 | Jain et al. ............... 709/230 |
| 2003/0135612 A1 | 7/2003 | Huntington |
| 2003/0167392 A1 | 9/2003 | Fransdonk |
| 2003/0185220 A1* | 10/2003 | Valenci ................... 370/398 |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2003/0233411 A1 | 12/2003 | Parry et al. |
| 2004/0001498 A1 | 1/2004 | Chen et al. |
| 2004/0010484 A1 | 1/2004 | Foulger et al. |
| 2004/0015579 A1 | 1/2004 | Cooper et al. |
| 2004/0036716 A1 | 2/2004 | Jordahl |
| 2004/0054779 A1 | 3/2004 | Takeshima et al. |
| 2004/0059736 A1 | 3/2004 | Willse et al. |
| 2004/0059920 A1 | 3/2004 | Godwin |
| 2004/0071164 A1 | 4/2004 | Baum |
| 2004/0111406 A1 | 6/2004 | Udeshi et al. |
| 2004/0111678 A1 | 6/2004 | Hara |
| 2004/0114518 A1 | 6/2004 | McFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0122936 A1 | 6/2004 | Mizelle et al. |
| 2004/0139120 A1 | 7/2004 | Clark et al. |
| 2004/0181513 A1 | 9/2004 | Henderson et al. |
| 2004/0181690 A1 | 9/2004 | Rothermel et al. |
| 2004/0193594 A1 | 9/2004 | Moore et al. |
| 2004/0194141 A1 | 9/2004 | Sanders |
| 2004/0196970 A1 | 10/2004 | Cole |
| 2004/0199595 A1* | 10/2004 | Banister et al. ............. 709/207 |
| 2004/0205457 A1 | 10/2004 | Bent et al. |
| 2004/0215612 A1 | 10/2004 | Brody |
| 2004/0220944 A1 | 11/2004 | Behrens et al. |
| 2004/0230572 A1 | 11/2004 | Omoigui |
| 2004/0249781 A1 | 12/2004 | Anderson |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033726 A1 | 2/2005 | Wu et al. |
| 2005/0033747 A1 | 2/2005 | Wittkotter |
| 2005/0033803 A1 | 2/2005 | Vleet et al. |
| 2005/0038788 A1 | 2/2005 | Dettinger et al. |
| 2005/0038809 A1 | 2/2005 | Abajian et al. |
| 2005/0044289 A1 | 2/2005 | Hendel et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0075103 A1 | 4/2005 | Hikokubo et al. |
| 2005/0086252 A1 | 4/2005 | Jones et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138110 A1 | 6/2005 | Redlich et al. |
| 2005/0138242 A1 | 6/2005 | Pope et al. |
| 2005/0138279 A1 | 6/2005 | Somasundaram |
| 2005/0149494 A1 | 7/2005 | Lindh et al. |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0182765 A1 | 8/2005 | Liddy |
| 2005/0188218 A1 | 8/2005 | Walmsley et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0273614 A1 | 12/2005 | Ahuja et al. |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0075228 A1 | 4/2006 | Black et al. |
| 2006/0080130 A1 | 4/2006 | Choksi |
| 2006/0083180 A1 | 4/2006 | Baba et al. |
| 2006/0106793 A1 | 5/2006 | Liang |
| 2006/0106866 A1 | 5/2006 | Green et al. |
| 2006/0150249 A1 | 7/2006 | Gassen et al. |
| 2006/0167896 A1 | 7/2006 | Kapur et al. |
| 2006/0184532 A1 | 8/2006 | Hamada et al. |
| 2006/0235811 A1 | 10/2006 | Fairweather |
| 2006/0242126 A1 | 10/2006 | Fitzhugh |
| 2006/0242313 A1* | 10/2006 | Le et al. ................... 709/230 |
| 2006/0251109 A1 | 11/2006 | Muller et al. |
| 2006/0253445 A1 | 11/2006 | Huang et al. |
| 2006/0271506 A1 | 11/2006 | Bohannon et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0011309 A1 | 1/2007 | Brady et al. |
| 2007/0028039 A1 | 2/2007 | Gupta et al. |
| 2007/0036156 A1 | 2/2007 | Liu et al. |
| 2007/0039049 A1 | 2/2007 | Kupferman et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0081471 A1 | 4/2007 | Talley et al. |
| 2007/0094394 A1 | 4/2007 | Singh et al. |
| 2007/0106660 A1 | 5/2007 | Stern et al. |
| 2007/0106685 A1 | 5/2007 | Houh et al. |
| 2007/0106693 A1 | 5/2007 | Houh et al. |
| 2007/0110089 A1 | 5/2007 | Essafi et al. |
| 2007/0112837 A1 | 5/2007 | Houh et al. |
| 2007/0112838 A1 | 5/2007 | Bjarnestam et al. |
| 2007/0116366 A1 | 5/2007 | Deninger et al. |
| 2007/0124384 A1 | 5/2007 | Howell et al. |
| 2007/0136599 A1 | 6/2007 | Suga |
| 2007/0139723 A1 | 6/2007 | Beadle et al. |

(56) References Cited

U.S. PATENT DOCUMENTS

| | | |
|---|---|---|
| 2007/0140128 A1 | 6/2007 | Klinker et al. |
| 2007/0143559 A1 | 6/2007 | Yagawa |
| 2007/0162609 A1 | 7/2007 | Pope et al. |
| 2007/0220607 A1 | 9/2007 | Sprosts et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0271254 A1 | 11/2007 | de la Iglesia et al. |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0027971 A1 | 1/2008 | Statchuk |
| 2008/0028467 A1 | 1/2008 | Kommareddy et al. |
| 2008/0030383 A1 | 2/2008 | Cameron |
| 2008/0082497 A1 | 4/2008 | Leblang et al. |
| 2008/0091408 A1 | 4/2008 | Roulland et al. |
| 2008/0112411 A1 | 5/2008 | Stafford et al. |
| 2008/0115125 A1 | 5/2008 | Stafford et al. |
| 2008/0140657 A1 | 6/2008 | Azvine et al. |
| 2008/0141117 A1 | 6/2008 | King et al. |
| 2008/0159627 A1 | 7/2008 | Sengamedu |
| 2008/0235163 A1 | 9/2008 | Balasubramanian et al. |
| 2008/0263019 A1 | 10/2008 | Harrison et al. |
| 2008/0270462 A1 | 10/2008 | Thomsen |
| 2009/0070327 A1 | 3/2009 | Loeser et al. |
| 2009/0070328 A1 | 3/2009 | Loeser et al. |
| 2009/0070459 A1 | 3/2009 | Cho et al. |
| 2009/0100055 A1 | 4/2009 | Wang |
| 2009/0157659 A1 | 6/2009 | Satoh et al. |
| 2009/0178110 A1 | 7/2009 | Higuchi |
| 2009/0187568 A1 | 7/2009 | Morin |
| 2009/0216752 A1 | 8/2009 | Terui et al. |
| 2009/0222442 A1 | 9/2009 | Houh et al. |
| 2009/0235150 A1 | 9/2009 | Berry |
| 2009/0254532 A1 | 10/2009 | Yang et al. |
| 2009/0288164 A1 | 11/2009 | Adelstein et al. |
| 2009/0300709 A1 | 12/2009 | Chen et al. |
| 2009/0326925 A1 | 12/2009 | Crider et al. |
| 2010/0011016 A1 | 1/2010 | Greene |
| 2010/0011410 A1 | 1/2010 | Liu |
| 2010/0037324 A1 | 2/2010 | Grant et al. |
| 2010/0088317 A1 | 4/2010 | Bone et al. |
| 2010/0100551 A1 | 4/2010 | Knauft et al. |
| 2010/0121853 A1 | 5/2010 | de la Iglesia et al. |
| 2010/0174528 A1 | 7/2010 | Oya et al. |
| 2010/0185622 A1 | 7/2010 | Deninger et al. |
| 2010/0191732 A1 | 7/2010 | Lowe et al. |
| 2010/0195909 A1 | 8/2010 | Wasson et al. |
| 2010/0268959 A1 | 10/2010 | Lowe et al. |
| 2010/0332502 A1 | 12/2010 | Carmel et al. |
| 2011/0004599 A1 | 1/2011 | Deninger et al. |
| 2011/0040552 A1 | 2/2011 | Van Guilder et al. |
| 2011/0131199 A1 | 6/2011 | Simon et al. |
| 2011/0149959 A1 | 6/2011 | Liu et al. |
| 2011/0167212 A1 | 7/2011 | Lowe et al. |
| 2011/0167265 A1 | 7/2011 | Ahuja et al. |
| 2011/0196911 A1 | 8/2011 | de la Iglesia et al. |
| 2011/0197284 A1 | 8/2011 | Ahuja et al. |
| 2011/0208861 A1 | 8/2011 | Deninger et al. |
| 2011/0219237 A1 | 9/2011 | Ahuja et al. |
| 2011/0258197 A1 | 10/2011 | de la Iglesia et al. |
| 2011/0276575 A1 | 11/2011 | de la Iglesia et al. |
| 2011/0276709 A1 | 11/2011 | Deninger et al. |
| 2012/0114119 A1 | 5/2012 | Ahuja et al. |
| 2012/0179687 A1 | 7/2012 | Liu |
| 2012/0180137 A1 | 7/2012 | Liu |
| 2012/0191722 A1 | 7/2012 | Deninger et al. |

OTHER PUBLICATIONS

Microsoft Outlook, Out look, copyright 1995-2000, 2 pages.

Preneel, Bart, "Cryptographic Hash Functions", Proceedings of the 3$^{rd}$ Symposium on State and Progress of Research in Cryptography, 1993, pp. 161-171.

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

U.S. Appl. No. 12/360,537, filed Jan. 27, 2009, entitled "Database for a Capture System," Inventor(s) Rick Lowe et al.

U.S. Appl. No. 11/254,436, filed Oct. 19, 2005, entitled "Attributes of Captured Objects in a Capture System," Inventor(s) William Deninger et al.

U.S. Appl. No. 12/472,150, filed May 26, 2009, entitled "Identifying Image Type in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/171,232, filed Jul. 10, 2008, entitled "System and Method for Data Mining and Security Policy Management," Inventor(s) Weimin Liu et al.

U.S. Appl. No. 12/690,153, filed Jan. 20, 2010, entitled "Query Generation for a Capture System," Inventor(s) Erik de la Iglesia, et al.

U.S. Appl. No. 12/751,876, filed Mar. 31, 2010, entitled "Attributes of Captured Objects in a Capture System," Inventor(s) William Deninger, et al.

U.S. Appl. No. 12/829,220, filed Jul. 1, 2010, entitled "Verifying Captured Objects Before Presentation," Inventor(s) Rick Lowe, et al.

U.S. Appl. No. 12/873,061, filed Aug. 31, 2010, entitled "Document Registration," Inventor(s) Ratinder Paul Singh Ahuja, et al.

U.S. Appl. No. 12/873,860, filed Sep. 1, 2010, entitled "A System and Method for Word Indexing in a Capture System and Querying Thereof," Inventor(s) William Deninger, et al.

U.S. Appl. No. 12/939,340, filed Nov. 3, 2010, entitled "System and Method for Protecting Specified Data Combinations," Inventor(s) Ratinder Paul Singh Ahuja, et al.

U.S. Appl. No. 12/967,013, filed Dec. 13, 2010, entitled "Tag Data Structure for Maintaining Relational Data Over Captured Objects," Inventor(s) Erik de la Iglesia, et al.

Han, Olap Mining: An Integration of OLAP with Data Mining, Oct. 1997, pp. 1-18.

Niemi, Constructing OLAP Cubes Based on Queries, Nov. 2001, pp. 1-7.

Schultz, Data Mining for Detection of New Malicious Executables, May 2001, pp. 1-13.

U.S. Appl. No. 13/024,923, filed Feb. 10, 2011, entitled "High Speed Packet Capture," Inventor(s) Weimin Liu, et al.

U.S. Appl. No. 13/047,068, filed Mar. 14, 2011, entitled "Cryptographic Policy Enforcement," Inventor(s) Ratinder Paul Singh Ahuja, et al.

U.S. Appl. No. 13/049,533, filed Mar. 16, 2011, entitled "File System for a Capture System," Inventor(s) Rick Lowe, et al.

U.S. Appl. No. 13/089,158, filed Apr. 18, 2011, entitled "Attributes of Captured Objects in a Capture System," Inventor(s) Ratinder Paul Singh Ahuja, et al.

U.S. Appl. No. 13/099,516, filed May 3, 2011, entitled "Object Classification in a Capture System," Inventor(s) William Deninger, et al.

Mao et al. "MOT: Memory Online Tracing of Web Information System," Proceedings of the Second International Conference on Web Information Systems Engineering (WISE '01); pp. 271-277, (IEEE-0-7695-1393-X/02) Aug. 7, 2002 (7 pages).

(56) References Cited

OTHER PUBLICATIONS

International Search Report and Written Opinion and Declaration of Non-Establishment of International Search Report for International Application No. PCT/US2011/024902 mailed Aug. 1, 2011 (8 pages).

U.S. Appl. No. 13/168,739, filed Jun. 24, 2011, entitled "Method and Apparatus for Data Capture and Analysis System," Inventor(s) Erik de la Iglesia, et al.

U.S. Appl. No. 13/187,421, filed Jul. 20, 2011, entitled "Query Generation for a Capture System," Inventor(s) Erik de la Iglesia, et al.

U.S. Appl. No. 13/188,441, filed Jul. 21, 2011, entitled "Locational Tagging in a Capture System," Inventor(s) William Deninger et al.

Webopedia, definition of "filter", 2002, p. 1.

Werth, T. et al., "Chapter 1—DAG Mining in Procedural Abstraction," Programming Systems Group; Computer Science Department, University of Erlangen-Nuremberg, Germany.

U.S. Appl. No. 13/422,791, filed on Mar. 16, 2012, entitled "System and Method for Data Mining and Security Policy Management", Inventor, Weimin Liu.

U.S. Appl. No. 13/424,249, filed on Mar. 19, 2012, entitled "System and Method for Data Mining and Security Policy Management", Inventor, Weimin Liu.

U.S. Appl. No. 13/431,678, filed on Mar. 27, 2012, entitled "Attributes of Captured Objects in a Capture System", Inventors William Deninger, et al.

U.S. Appl. No. 13/436,275, filed on Mar. 30, 2012, entitled "System and Method for Intelligent State Management", Inventors William Deninger, et al.

U.S. Appl. No. 13/337,737, filed Dec. 27, 2011, entitled "System and Method for Providing Data Protection Workflows in a Network Environment", Inventor(s) Ratinder Paul Singh Ahuja, et al.

U.S. Appl. No. 13/338,060, filed Dec. 27, 2011, entitled "System and Method for Providing Data Protection Workflows in a Network Environment", Inventor(s) Ratinder Paul Singh Ahuja, et al.

U.S. Appl. No. 13/338,159, filed Dec. 27, 2011, entitled "System and Method for Providing Data Protection Workflows in a Network Environment", Inventor(s) Ratinder Paul Singh Ahuja, et al.

U.S. Appl. No. 13/338,195, filed Dec. 27, 2011, entitled "System and Method for Providing Data Protection Workflows in a Network Environment", Inventor(s) Ratinder Paul Singh Ahuja, et al.

Walter Allasia et al., Indexing and Retrieval of Multimedia Metadata on a Secure DHT, University of Torino, Italy, Department of Computer Science, Aug. 31, 2008, 16 pages.

International Preliminary Report on Patentability Written Opinion of the International Searching Authority for International Application No. PCT/US2011/024902 dated May 7, 2013 (5 pages).

U.S. Appl. No. 13/896210, filed May 16, 2013, entitled "System and Method for Data Mining and Security Policy Management" Inventor(s) Ratinder Paul Singh Ahuja et al.

* cited by examiner

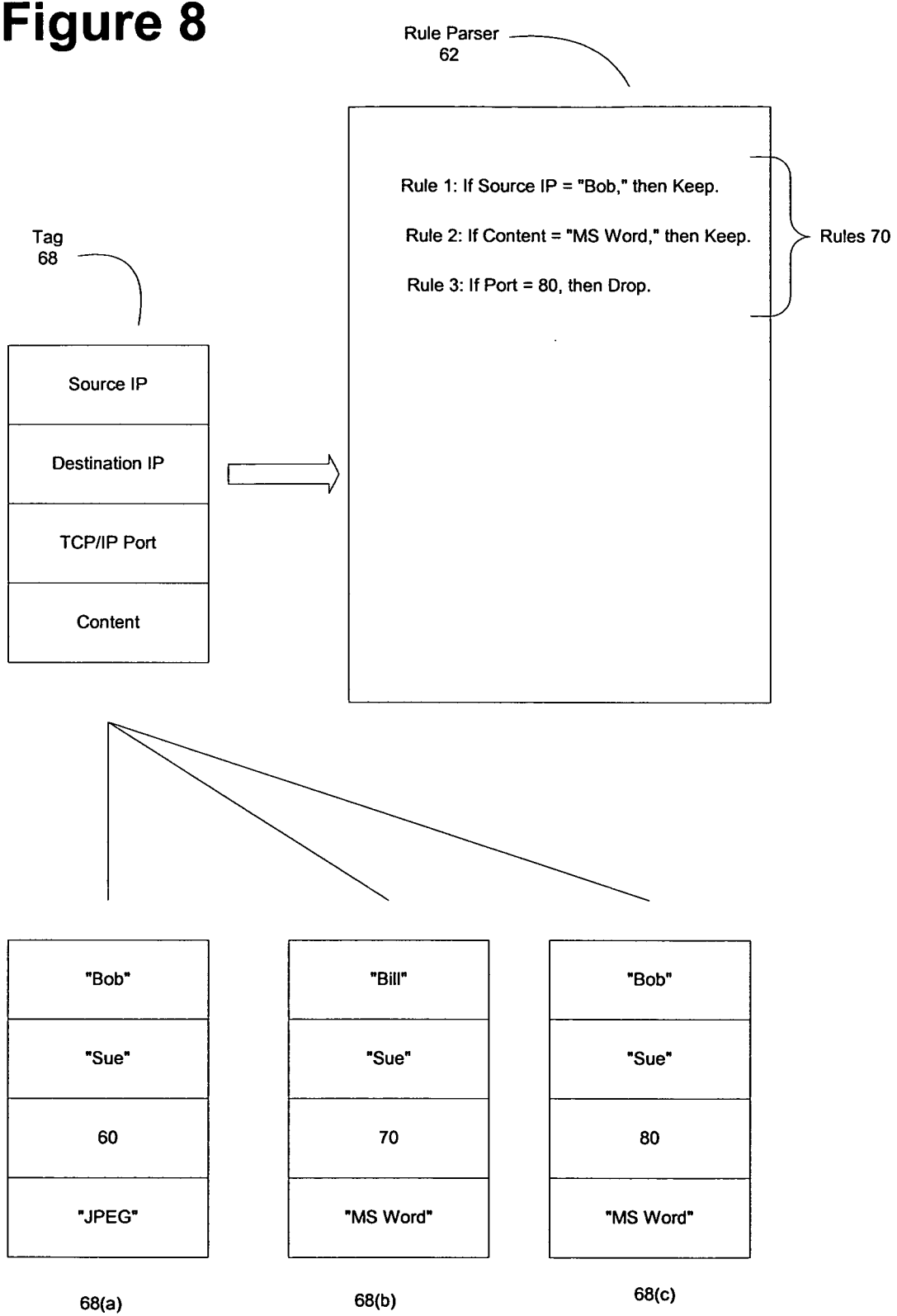

Figure 9

TAG 68 (6 digits)

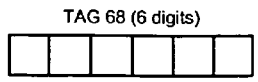

Rule 1 (123***)

| Table 1:1 |
|---|
| 0) DONE,MISS |
| 1) GOTO 1:2 |
| 2) DONE,MISS |
| 3) DONE,MISS |
| 4) DONE,MISS |
| 5) DONE,MISS |
| 6) DONE,MISS |
| 7) DONE,MISS |
| 8) DONE,MISS |
| 9) DONE,MISS |

| Table 1:2 |
|---|
| 0) DONE,MISS |
| 1) DONE,MISS |
| 2) GOTO 1:3 |
| 3) DONE,MISS |
| 4) DONE,MISS |
| 5) DONE,MISS |
| 6) DONE,MISS |
| 7) DONE,MISS |
| 8) DONE,MISS |
| 9) DONE,MISS |

| Table 1:3 |
|---|
| 0) DONE,MISS |
| 1) DONE,MISS |
| 2) DONE,MISS |
| 3) DONE,HIT |
| 4) DONE,MISS |
| 5) DONE,MISS |
| 6) DONE,MISS |
| 7) DONE,MISS |
| 8) DONE,MISS |
| 9) DONE,MISS |

State Table Chain 74

Rule 2 (*4[5-9]*7*)

| Table 2:1 |
|---|
| 0) GOTO 2:2 |
| 1) GOTO 2:2 |
| 2) GOTO 2:2 |
| 3) GOTO 2:2 |
| 4) GOTO 2:2 |
| 5) GOTO 2:2 |
| 6) GOTO 2:2 |
| 7) GOTO 2:2 |
| 8) GOTO 2:2 |
| 9) GOTO 2:2 |

| Table 2:2 |
|---|
| 0) DONE,MISS |
| 1) DONE,MISS |
| 2) DONE,MISS |
| 3) DONE,MISS |
| 4) GOTO 2:3 |
| 5) DONE,MISS |
| 6) DONE,MISS |
| 7) DONE,MISS |
| 8) DONE,MISS |
| 9) DONE,MISS |

| Table 2:3 |
|---|
| 0) DONE,MISS |
| 1) DONE,MISS |
| 2) DONE,MISS |
| 3) DONE,MISS |
| 4) DONE,MISS |
| 5) GOTO 2:4,Skip1 |
| 6) GOTO 2:4,Skip1 |
| 7) GOTO 2:4,Skip1 |
| 8) GOTO 2:4,Skip1 |
| 9) GOTO 2:4,Skip1 |

| Table 2:4 |
|---|
| 0) DONE,MISS |
| 1) DONE,MISS |
| 2) DONE,MISS |
| 3) DONE,MISS |
| 4) DONE,MISS |
| 5) DONE,MISS |
| 6) DONE,MISS |
| 7) DONE,HIT |
| 8) DONE,MISS |
| 9) DONE,MISS |

State Table 72

Rule 3 (12**5*)

| Table 3:1 |
|---|
| 0) DONE,MISS |
| 1) GOTO 3:2 |
| 2) DONE,MISS |
| 3) DONE,MISS |
| 4) DONE,MISS |
| 5) DONE,MISS |
| 6) DONE,MISS |
| 7) DONE,MISS |
| 8) DONE,MISS |
| 9) DONE,MISS |

| Table 3:2 |
|---|
| 0) DONE,MISS |
| 1) DONE,MISS |
| 2) GOTO 3:3,Skip2 |
| 3) DONE,MISS |
| 4) DONE,MISS |
| 5) DONE,MISS |
| 6) DONE,MISS |
| 7) DONE,MISS |
| 8) DONE,MISS |
| 9) DONE,MISS |

| Table 3:3 |
|---|
| 0) DONE,MISS |
| 1) DONE,MISS |
| 2) DONE,MISS |
| 3) DONE,MISS |
| 4) DONE,MISS |
| 5) DONE,HIT |
| 6) DONE,MISS |
| 7) DONE,MISS |
| 8) DONE,MISS |
| 9) DONE,MISS |

Rule 1 + Rule 2 + Rule 3

| Table 4:1 |
|---|
| 0) GOTO 4:2 |
| 1) GOTO 4:2 |
| 2) GOTO 4:2 |
| 3) GOTO 4:2 |
| 4) GOTO 4:2 |
| 5) GOTO 4:2 |
| 6) GOTO 4:2 |
| 7) GOTO 4:2 |
| 8) GOTO 4:2 |
| 9) GOTO 4:2 |

| Table 4:2 |
|---|
| 0) DONE,MISS |
| 1) DONE,MISS |
| 2) GOTO 4:3 |
| 3) DONE,MISS |
| 4) GOTO 4:3 |
| 5) DONE,MISS |
| 6) DONE,MISS |
| 7) DONE,MISS |
| 8) DONE,MISS |
| 9) DONE,MISS |

| Table 4:3 |
|---|
| 0) GOTO 4:4,Skip1 |
| 1) GOTO 4:4,Skip1 |
| 2) GOTO 4:4,Skip1 |
| 3) DONE,Rule 1 |
| 4) GOTO 4:4,Skip1 |
| 5) GOTO 4:4,Skip1 |
| 6) GOTO 4:4,Skip1 |
| 7) GOTO 4:4,Skip1 |
| 8) GOTO 4:4,Skip1 |
| 9) GOTO 4:4,Skip1 |

| Table 4:4 |
|---|
| 0) DONE,MISS |
| 1) DONE,MISS |
| 2) DONE,MISS |
| 3) DONE,MISS |
| 4) DONE,MISS |
| 5) DONE,Rule 3 |
| 6) DONE,MISS |
| 7) DONE,Rule 2 |
| 8) DONE,MISS |
| 9) DONE,MISS |

State Table Tree 76

| Status Indicator 80 | Rule Match Indicator 82 | Exit Location Indicator 84 | Forward/Reverse Operator 86 | Next Table Location Indicator 90 |

State Table Entry 78

Figure 10

RULE PARSER

PRIORITY AND RELATED APPLICATIONS

This patent application is related to, incorporates by reference, and claims the priority benefit of U.S. Provisional Application 60/528,642, entitled "METHOD AND APPARATUS FOR DYNAMIC RULE PARSER AND CAPTURE SYSTEM," filed Dec. 10, 2003.

FIELD OF THE INVENTION

The present invention relates to computer technology, and in particular, to a rule parser.

BACKGROUND

Computer networks and systems have become indispensable tools for modern business. Modern enterprises use such networks for communications and for storage. The information and data stored on the network of a business enterprise is often a highly valuable asset. Modem enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyse the data leaving the network to monitor for policy violations, and make it possible to track down information leeks. What is needed is a comprehensive system to capture, store, and analyse all data communicated using the enterprises network.

SUMMARY OF THE INVENTION

In one embodiment of the present invention, a rule compiler can compress a plurality of rules to be parsed over a block of data into one state table tree structure. In one embodiment of the present invention, rue parsing over the block of data includes selecting a unit of the block of data, indexing into a state table of the state table tree using the selected unit. The state table indexed into can be used for determining whether a decision regarding the block of data can be reached based on the indexed entry, and for selecting a next state table indicated by the indexed entry if the decision regarding the block of data cannot be reached.

BRIEF DESCRIPTION OF THE DRAWINGS

The present invention is illustrated by way of example, and not by way of refer to similar elements and in which:

FIG. 8 illustrates an example of tags being parsed using rules according to one embodiment of the present invention;

FIG. 9 illustrates a simplified example of rule compiling according to one embodiment of the present invention;

FIG. 10 illustrates an example state table entry according to one embodiment of the present invention.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
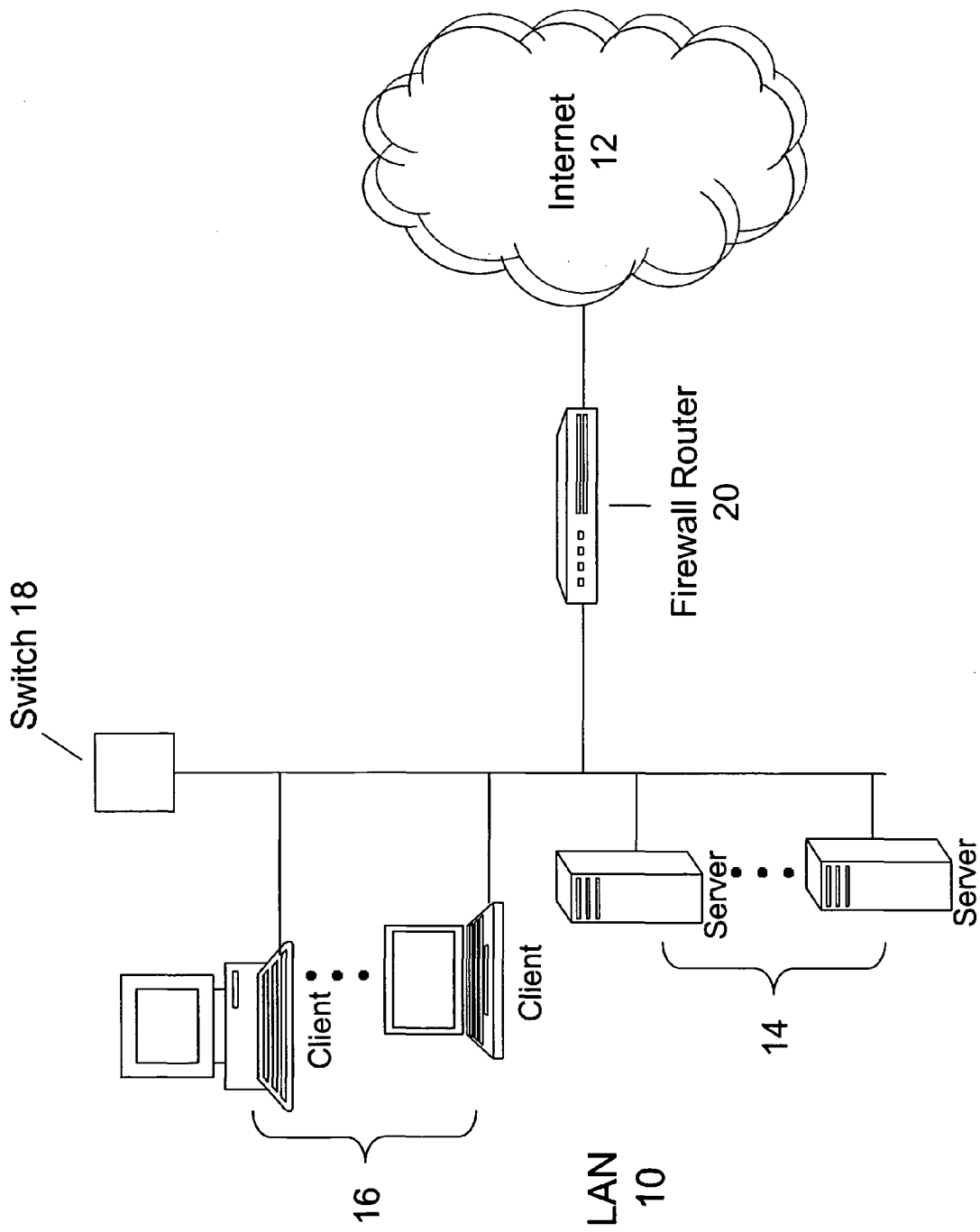
FIG. 1 is a block diagram illustrating a computer network connected to the Internet.

FIG. 1 illustrates a simple prior art configuration of a local area network (LAN) 10 connected to the Internet 12. Connected to the LAN 102 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 12. However, there the router 20 merely forwards packets to the Internet 12. The router 20 cannot capture, analyse, and searchably store the content contained in the forwarded packets.

Figure 2:
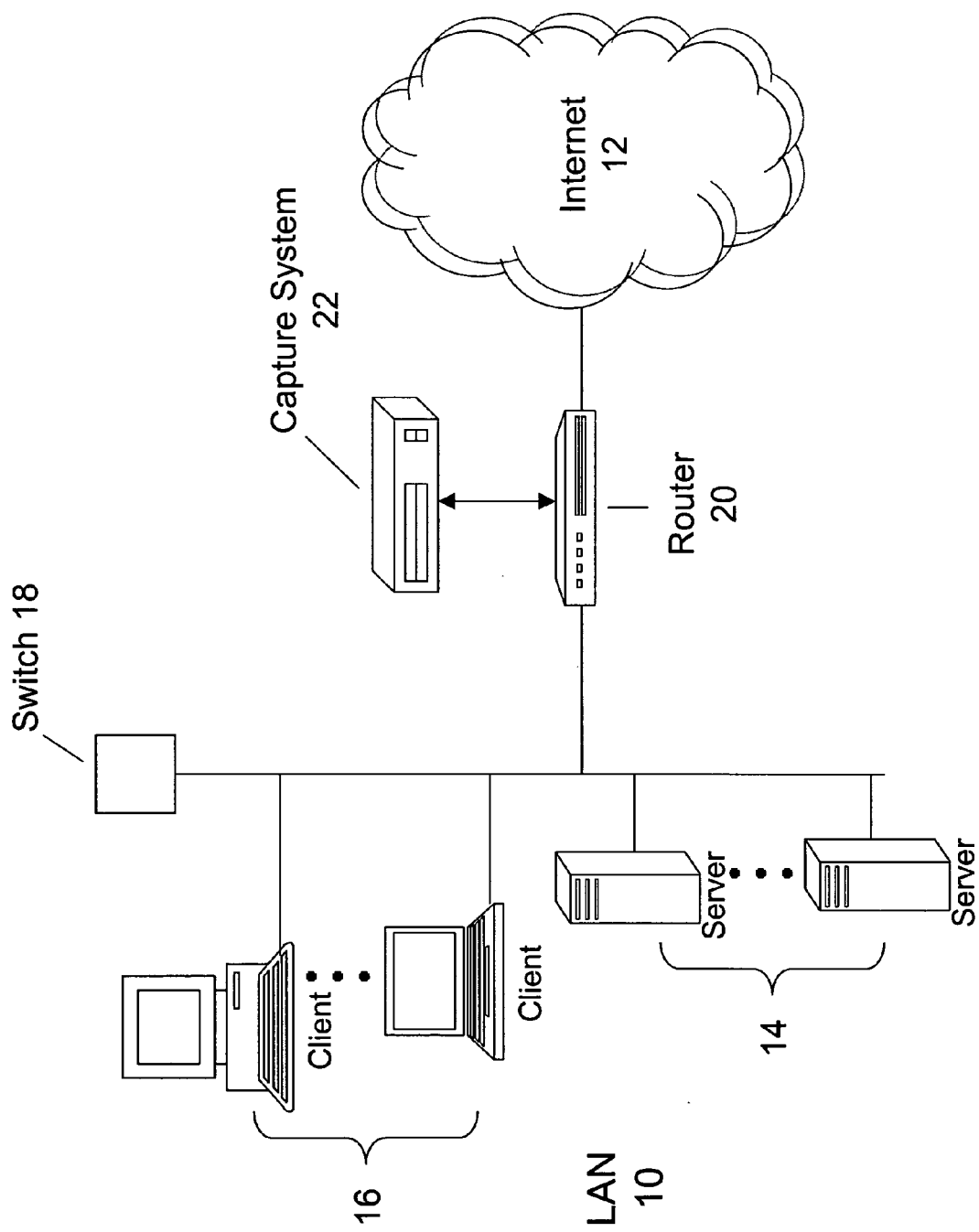
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 12 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 12 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
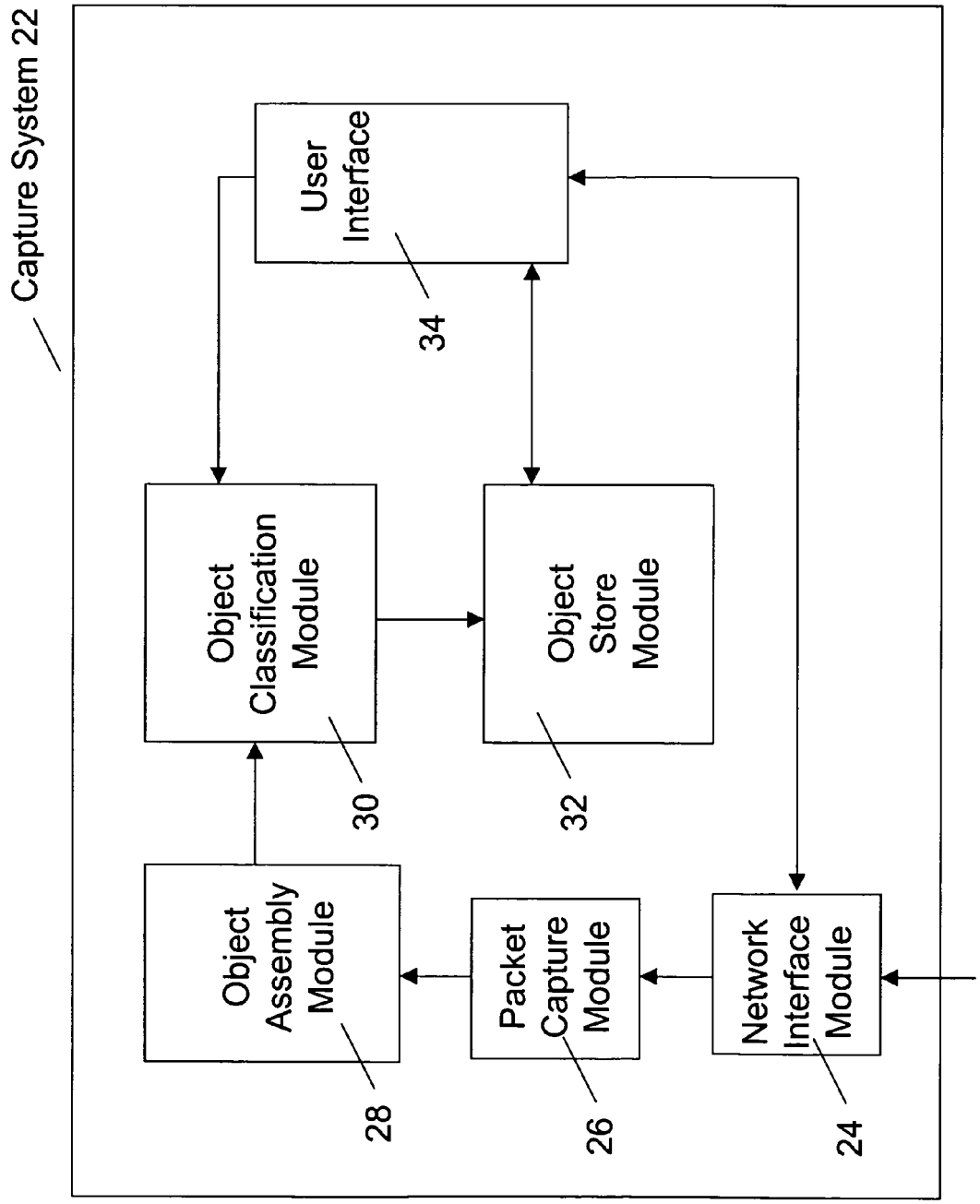
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
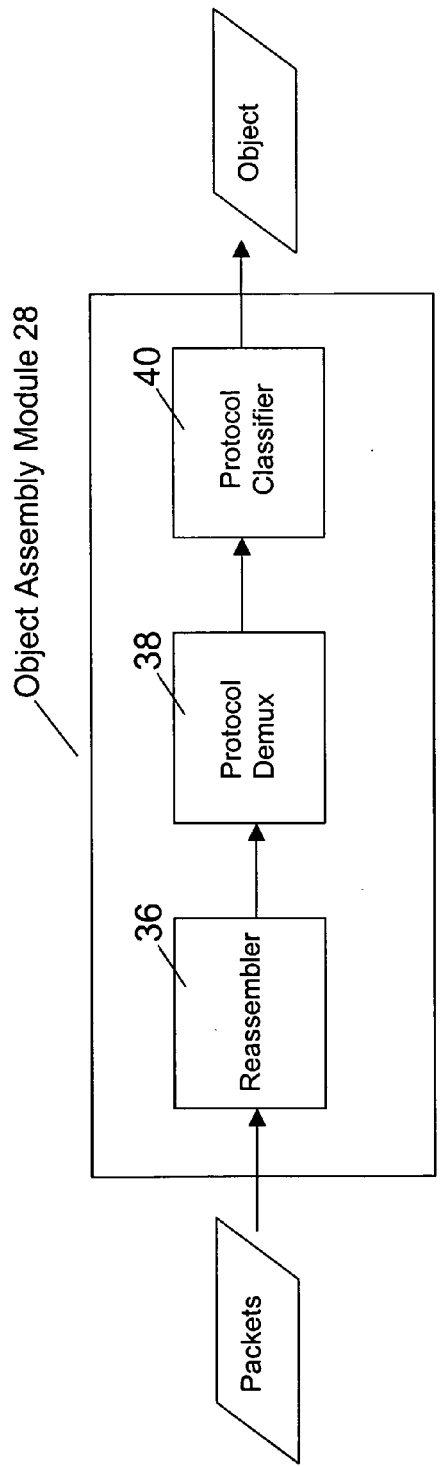
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the ressembler 36. Thus, in one embodiment, a flow is an ordered data stream of a single communication between a source and a destination.

The flown assembled by the reassember 36 can then be provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
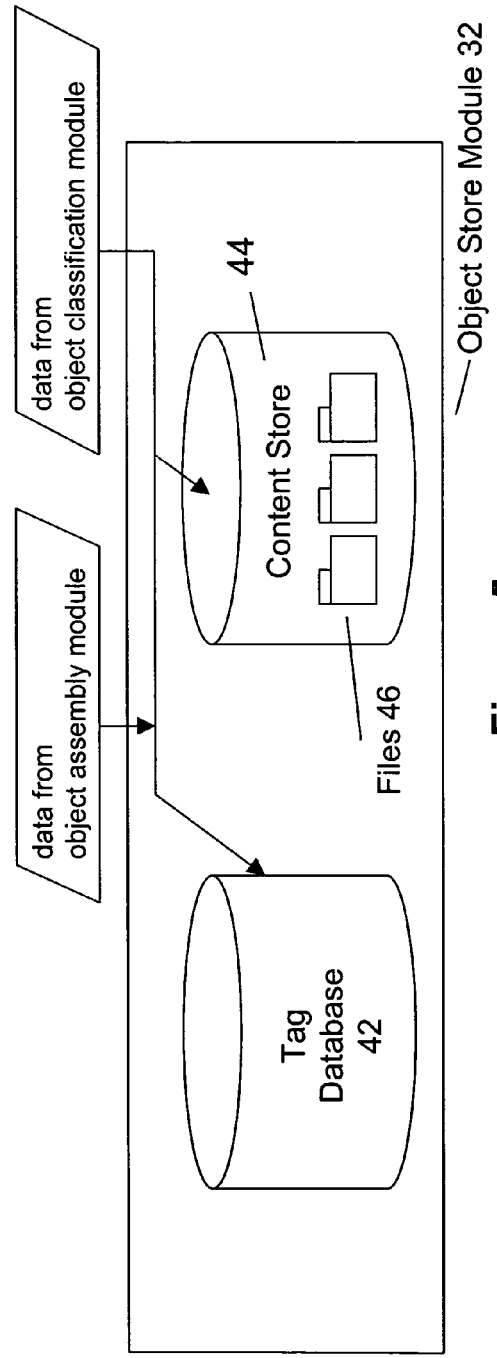
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

Tag Data Structure

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44 and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labelled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); C++ Source, C Source, FORTRAN Source, Verilog Source (for source or design code authored in these high-level programming languages); C Shell, K Shell, Bash Shell (for shell program scripts); Plaintext (for otherwise unclassified textual objects ); Crypto (for objects that have been encrypted or that contain cryptographic elements); Binary Unknown, ASCII Unknown, and Unknown (as catchall categories).

The signature contained in the Signature and Tag Signature fields can be any digest or hash over the object, or some portion thereof. In one embodiment, a well known hash, such as MD5 or SHA1 can be used. In one embodiment, the signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

Rule Parser

As described above, in one embodiment, the object classification module 30 determines whether each captured object/document should be stored. In one embodiment, this determination is based on capture rules provided by a user (or pre-configured into the system). In one embodiment, the capture rules can specify which captured objects should be stored based on the information collected in the tag associated with the object, such as content type, source IP, and so on. Thus, in one embodiment, the capture system 22 includes—e.g., in the object classification module 30, or as an independent module—a capture filter 60 configured to make a determination about what to do with each captured object.

Figure 7:
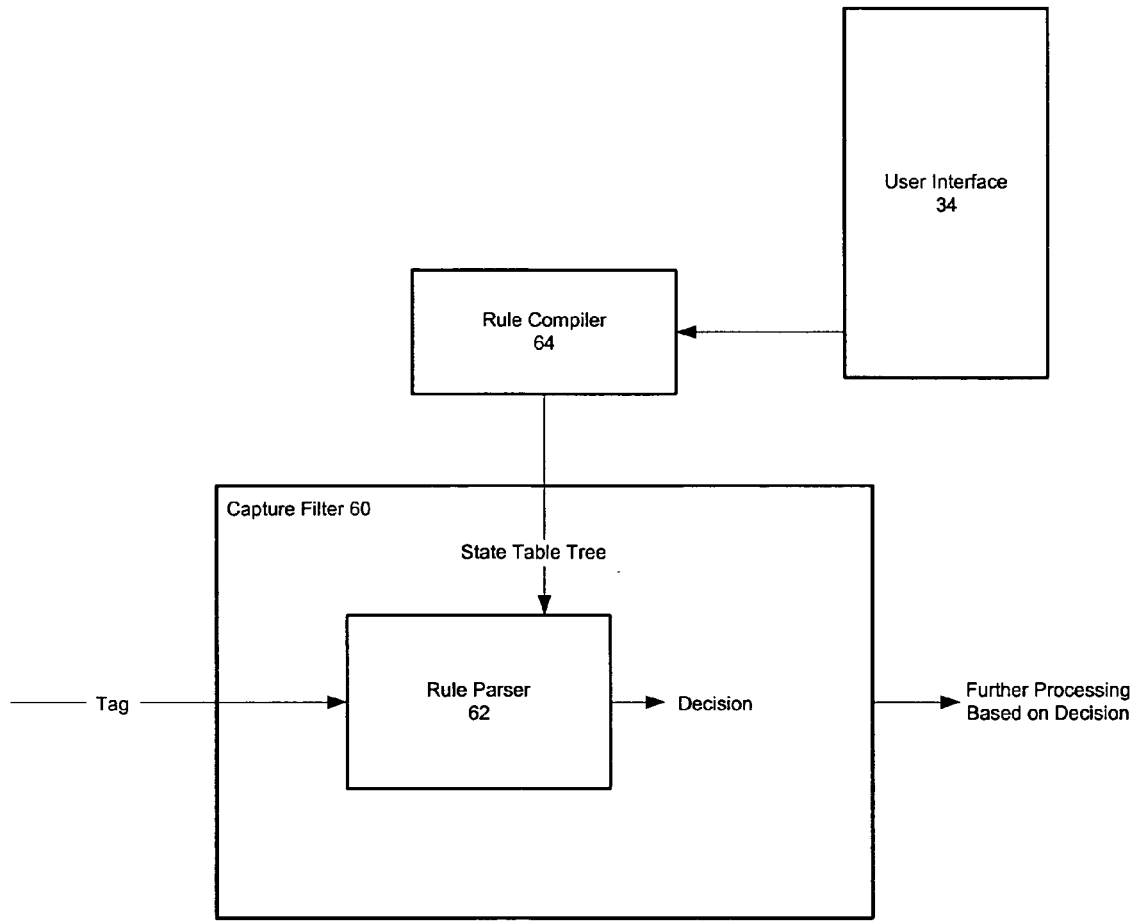
FIG. 7 is a block diagram illustrating a rule compiler and a capture filter according to one embodiment of the present invention.

One embodiment of the capture filter 60 is now described with reference to FIG. 7. In one embodiment, the capture filter 60 receives as input a tag—e.g., such as a tag described with reference to Tables 1 and 2—associated with a captured object. The tag is provided to a rule parser 62 that parses all the capture rules over the tag to see if it satisfies any of the capture rules.

The rule parser 62 provides the capture filter 60 with a decision based on which, if any, rules applied to the tag. The decision can be any decision supported by the system 22, such as store the object, discard the object, log the object, and so on. The capture filter 60 then directs further processing of the captured object and its tag based on the decision. For example, if a capture rule indicating that an object should be stored is hit by the tag, then the capture filter 60 will cause the object and its tag to be stored in the object store module 32

FIG. 8 provides a simplified illustration of the operation of the rule parser 62. The rule parser 63 applies rules 70 to tags 68 associated with objects. For example, given the rules 70 in FIG. 8, the object described by tag 68(*a*) from Bob will be kept because it hits Rule 1, the object described by tag 68(*b*) from Bill will be kept because it hits Rule 2, and the object described by.tag 68(*c*) from Bob will be kept or dropped depending on which rule has precedence. If either Rule 1 or 2 has precedence over Rule 3, then the object will be kept, otherwise, it will be dropped. The illustration in FIG. 8 demonstrates, that in one embodiment, rules have a precedence order, and rules are not orthogonal, i.e., one tag can hit more than one rule.

Referring again to FIG. 7, in one embodiment the rule parser 62 parses all capture rules by traversing a state table tree one time. In one embodiment, the state table tree is generated by a rule compiler 64 that compiles the capture rules authored by the system users into the state table tree. In one embodiment, the state table tree is a data structure in the form of a tree whose nodes are state tables indicating the state of the parsing. Other appropriate data structures may be used.

A simplified illustration of how the rule compiler 64 can translate a rule into a state table chain and compress a plurality of rules into a state table tree is now provided with reference to FIG. 9. The tag 68 shown on FIG. 9 is a six-digit number, with digits ranging from 0-9. There are three rules defined by a pattern that is hit if the tag satisfies the pattern. While simplified, this approach is directly analogous for finding patterns in the tag fields of the capture system 22, or to any similar pattern matching scheme.

Rule 1 is hit if the first three (from left to right) digits of the tag 68 are 123. Similarly, Rule 2 is hit if the second digit is 4, the third digit is between 5-9, and the fifth digit is 7. Each rule is expressed as a chain of state tables 72, referred to as a state table chain 74. The state tables are used by reading digits from left to right from the tag, and using the digits to index into the state tables. In one real world embodiment, the tag is read on a per byte basis, making each state table have 256 rows, each having an 8-bit index.

In the example in FIG. 9, following the state table chain for each rule will always result in either a HIT or MISS determination for any possible tag. The entries of the state tables either indicate a DONE condition that show whether the rule was hit or missed by the tag 68, or they indicate the next table to be used. An entry can also indicate whether the reading of the digits should skip ahead (or backwards) when indexing into the next table.

In one embodiment, the rule compiler 64 generates the state table tree 76 by compressing a plurality of state table chains 74, as illustrated in FIG. 9. Traversing the state table tree 76 in FIG. 9 parses the tag 68 for all three rules simultaneously. The demonstration in FIG. 9 is highly simplified. A real world tag may be much larger than the example tag 68. For example, a tag as shown in Table 1 will generally be between 64 and 264 bytes in size. Parsing such a tag on a per-byte basis would involve much larger state tables, longer state table chains, and a more complicated state table tree. However, the underlying concepts would be similar to those described with reference to FIG. 9.

Since the state table tree 76 shown in FIG. 9 is a simplified example, it can easily be collapsed into a single-branched tree. However, the state table tree may have more than one branch. In one embodiment, each branch is at most as long as the longest state table chain used to construct the tree. Since tree traversal speed is determined by branch length, such a tree can still traverse all rules within a predictable and fast time. How compressed the state table tree of a real world embodiment is depends on a tradeoff between memory available to store the tree, and speed required to edit the tree (e.g., when the user authors new rules and/or deletes old rules). The tradeoff is that the more compressed the state table tree is the less memory it uses, but the more time it takes to edit.

In one embodiment, rules can be inserted, deleted, or edited at any time. This can be done by de-compiling the state table tree (or relevant portions of the state table tree), making the appropriate changes, and re-compiling the tree. For example, in one embodiment, if Rule 2 in FIG. 9 where to be edited, the state table chain 74 for Rule 2 is extracted out of the tree 76 and edited, and then the tree 76 is re-compiled.

Certain rules can be edited, inserted, or deleted without affecting the tree 76 to an extent to require de- and re-compiling. On the state table tree 76 shown in FIG. 9, state table 4:4 is a "leaf node," a node on the tree having no children. In a more complex real-world state table tree there may be many leaf nodes. Since leaf nodes have no children (i.e., do not effect further processing), if a new, edited, or deleted rule only affects a leaf nodes, then the edit can be implemented without de-compiling and re-compiling any parts of the tree. This results in a highly efficient method of inserting, deleting, and editing some rules.

One embodiment of an entry 78 for a state table 72 is now described with reference to FIG. 10. In one embodiment, the entry includes an index field 80. The index 80 is the value used to index into the state table 72. For example, if the tag were read byte by byte (8 bits), then the index 80 would be 8 bits long, ranging in decimal value from 0 to 255 (00000000 to 11111111 in binary).

In one embodiment, the entry 78 also includes a status indicator 82. The status indicator 82 provides information about the status of the rule matching. In one embodiment, there are three possible statuses being indicated: HIT, MISS, and NOT DONE. A HIT status indicates that a rule has been hit and the parsing is finished. A MISS status indicates that the tag cannot possibly hit any rules included in the state table tree, and the parsing is finished. A NOT DONE status indicates that no determination about HIT or MISS conditions can be made at the present time.

In one embodiment, the entry 78 includes a rule match indicator 84 that is accessed if the status indicator 82 shown a HIT condition. In one embodiment, the rule match indicator 84 identifies the rule that is hit (e.g., rule 3). In one embodiment, the rule is not identified by name, and the rule match indicator 84 contains the next point of program execution, which is determined by the rule hit.

Similarly, a MISS condition indicated by the status indicator 82 results in the accessing of the exit location indicator 86. In one embodiment, the exit location indicator 86 contains the next point of program execution, which is configured to take into account that none of the rules were hit. In another embodiment, program execution may continue from a single place after flags indicating the results of the parsing have been set.

In one embodiment, a NOT DONE condition indicates that the forward/reverse operator 88 should be accessed. The forward reverse operator 88 indicates how many positions to go forwards or backwards before reading the next unit of the tag.

The forward reverse operator can be implemented as a number that can take positive or negative values indicating how many bytes (or other units of reading the tag) to skip and in what direction.

In one embodiment, the entry 78 also includes a next table location indicator 90 identifying the next state table of the state table tree to index into using the next byte of tag read.

Figure 11:
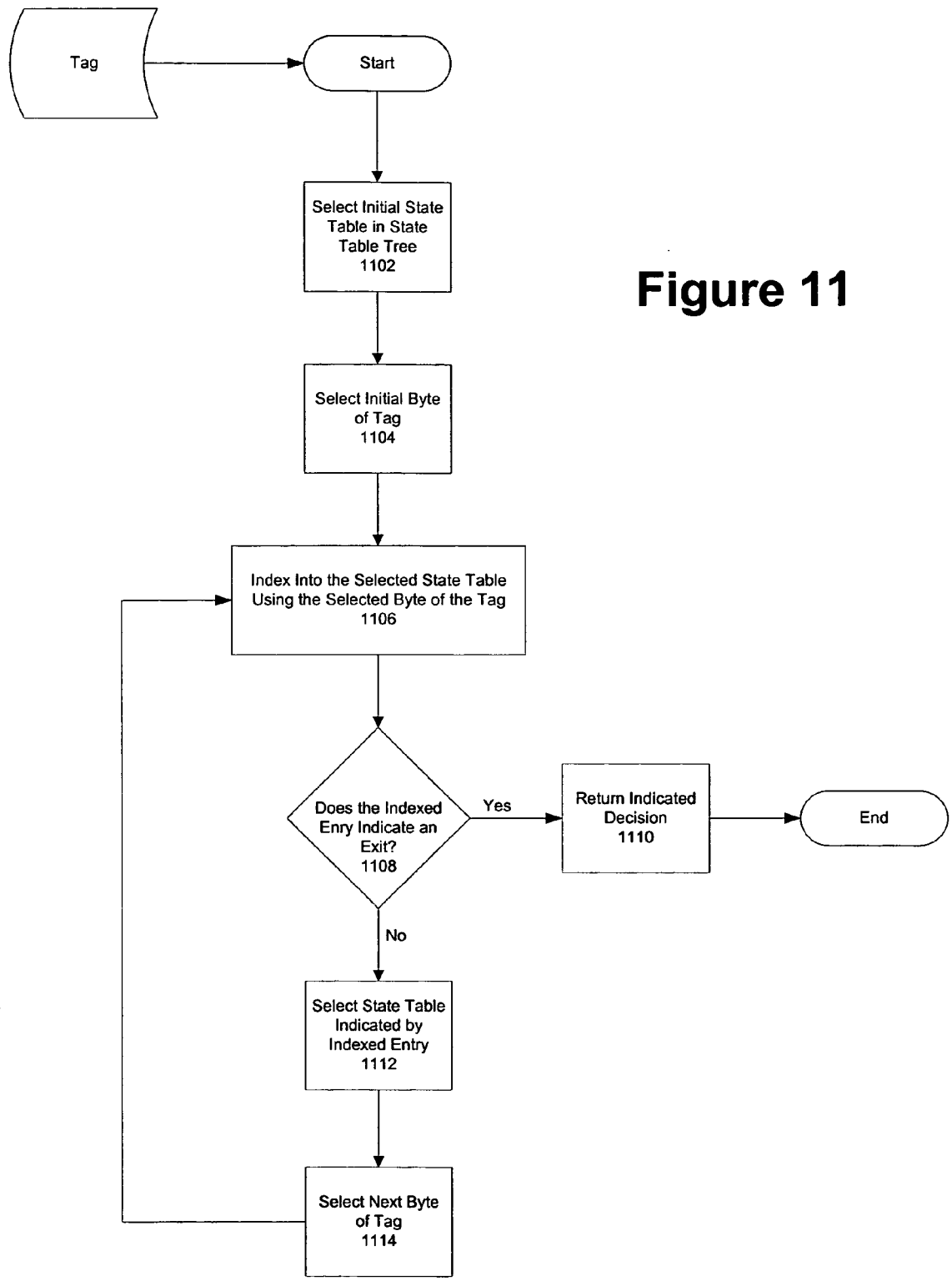
FIG. 11 is a flow diagram illustrating a rule parsing method according to one embodiment of the present invention.

A simplified flow diagram for parsing a tag using the state table tree is now described with reference to FIG. 11. First, the initial (root) state table node of the tree is selected in block 1102, and the initial byte of the tag being parsed is selected in block 1104. Then, the selected state table is indexed into using the selected byte in block 1106, as described above.

In block 1108, a decision is made as to whether the indexed state table entry is indicating an exit. If yes, then, in block 1110, the decision reached is indicated. For example, a decision may be "Rule 2 hit," or "Global Miss." If an exit is not indicated, i.e., if rule parsing is not finished, then, in block 1112, the next state table node of the state table tree is selected, e.g., as indicated by the indexed entry.

In block 1114, the next byte of the tag is read. This could include performing a forward or backward skip, if one is indicated by the indexed entry, or it may include sequentially inputting the next byte if no jump is required. Then, the processing proceeds again from block 1106, using the newly selected state table and tag byte as inputs.

General Matters

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
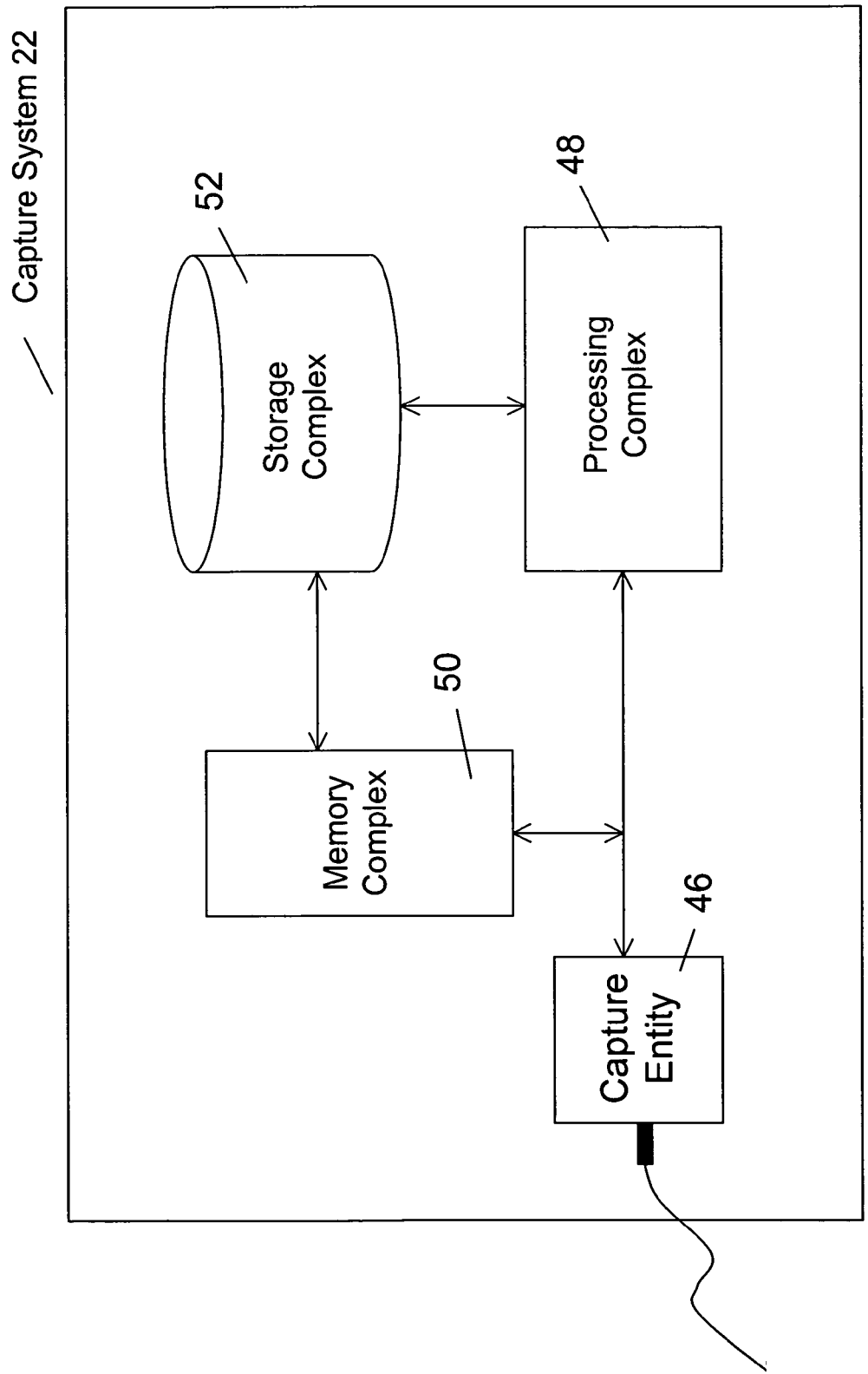
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Thus, a capture system, a rule parser, and a rule compiler have been described. The above-described rule parser and rule compiler can be implemented outside of a capture system, and can be used for any rule parsing or pattern recognition. The capture filter implementation described above is only one embodiment of the present invention.

In the forgoing description, various specific values were given names, such as "tag," and various specific modules, such as the "rule compiler" and "capture filter" have been described. However, these names are merely to describe and illustrate various aspects of the present invention, and in no way limit the scope of the present invention. Furthermore, various modules, such as the rule compiler 64 and the rule parser 62 in FIG. 7, can be implemented as software or hardware modules, or without dividing their functionalities into modules at all. The present invention is not limited to any modular architecture either in software or in hardware, whether described above or not.

What is claimed is:

1. A method comprising:
receiving a plurality of capture rules used to determine whether intercepted objects are to be stored;
for each received rule, constructing a state table chain configured to parse a tag for the rule;
generating a state table tree using the plurality of state table chains, the state table tree being configured to parse the tag for the plurality of capture rules; and
intercepting packets being transmitted on a network, the packets associated with a document that includes the intercepted objects, wherein the document is captured based on a particular capture rule associated with the intercepted objects, and wherein the tag comprises a data structure containing meta-data associated with a particular intercepted object, and wherein the document is stored in response to traversing the state table tree to parse the tag and match the tag to the particular capture rule.

2. The method of claim 1, wherein receiving the plurality of capture rules comprises a user inputting at least one of the plurality of capture rules via a user interface.

3. The method of claim 1, wherein generating the state table tree comprises combining the plurality of state table chains to a configured tradeoff level, the tradeoff level indicating a tradeoff between memory usage and editing speed for the state table tree.

4. The method of claim 1, further comprising receiving an edited version of one of the plurality of capture rules, and re-generating the state table tree in response to the received edited version.

5. A method of rule parsing over a block of data comprising:
selecting a unit of the block of data;
indexing into a state table using the selected unit;
determining whether a decision regarding the block of data can be reached based on the indexed entry;
selecting a next state table indicated by the indexed entry if the decision regarding the block of data cannot be reached, wherein the block of data comprises a tag and each unit of the tag comprises a byte; and
intercepting packets being transmitted on a network, the packets associated with a document that includes intercepted objects, wherein the document is captured based on a particular capture rule associated with the intercepted objects, and wherein the tag comprises a data structure containing meta-data associated with a particular intercepted object, and wherein the document is stored in response to traversing the state table to parse the tag and match the tag to the particular capture rule.

6. The method of claim 5, further comprising selecting a next unit of the block of data if the decision regarding the block of data cannot be reached.

7. The method of claim 6, further comprising iteratively repeating indexing into the next state table using the next unit, determining whether the decision regarding the block of data can be reached based on the indexed entry, and selecting another next state table indicated by the indexed entry if the decision regarding the block of data cannot be reached, until the decision regarding the block of data is reached.

8. The method of claim 6, wherein selecting the next unit the block of data is based on a forward/reverse operator indicated by the indexed entry.

9. The method of claim 5, wherein the block of data comprises a tag and each unit of the tag comprises a byte.

10. A capture device comprising:
a user interface to enable a user to author a plurality of capture rules;
a rule compiler to generate a state table tree, wherein a single traversal of the state table tree applies all of the plurality of capture rules to a tag containing meta-data over an intercepted object; and
a rule parser to parse the capture rules by traversing the state table tree using the tag, the capture device being configured to intercept packets being transmitted on a network, the packets associated with a document that includes the intercepted objects, wherein the document is captured based on a particular capture rule associated with the intercepted objects, and wherein the tag comprises a data structure containing meta-data associated with a particular intercepted object, and wherein the document is stored in response to traversing the state table tree to parse the tag and match the tag to the particular capture rule.

11. The capture device of claim 10, further comprising a capture filter to determine whether to store the intercepted object based on the decision, wherein the decision comprises a determination of one of the plurality of capture rules being hit by the tag.

12. The capture device of claim 11, further comprising an object store module to store the intercepted object and the tag.

13. The capture device of claim 12, wherein the object store module comprises a canonical content store to store the intercepted object and a tag database to store the tag.

14. The capture device of claim 10, further comprising an object capture and classification module to populate the tag by reconstructing and classifying the captured object.

15. The capture device of claim 10, wherein the user interface is configured to allow a user to edit the plurality of capture rules, delete one of the plurality of capture rules, and insert a new capture rule, and the rule compiler is configured to re-generate the state table tree in response to the user editing, deleting, or inserting a capture rule.

16. The capture device of claim 10, wherein the rule compiler is configured to generate the state table tree by constructing a state table chain corresponding to each capture rule, and generating the state table tree by combining at least a part of each state table chain.

17. A non-transitory machine-readable medium having stored thereon data representing instructions that, when executed by a processor, cause the processor to perform operations comprising:
receiving a plurality of capture rules used to determine whether intercepted objects are to be stored;
for each received rule, constructing a state table chain configured to parse a tag for the rule;
generating a state table tree using the plurality of state table chains, the state table tree being configured to parse the tag for the plurality of capture rules; and
intercepting packets being transmitted on a network, the packets associated with a document that includes the intercepted objects, wherein the document is captured based on a particular capture rule associated with the intercepted objects, and wherein the tag comprises a data structure containing meta-data associated with a particular intercepted object, and wherein the document is stored in response to traversing the state table tree to parse the tag and match the tag to the particular capture rule.

18. The non-transitory machine-readable medium of claim 17, wherein receiving the plurality of capture rules comprises a user inputting at least one of the plurality of capture rules via a user interface.

19. The non-transitory machine-readable medium of claim 17, wherein generating the state table tree comprises combining the plurality of state table chains to a configured tradeoff level, the tradeoff level indicating a tradeoff between memory usage and editing speed for the state table tree.

20. The non-transitory machine-readable medium of claim 17, further comprising receiving an edited version of one of the plurality of capture rules, and re-generating the state table tree in response to the received edited version.

21. A non-transitory machine-readable medium having stored thereon data representing instructions that, when executed by a processor, cause the processor to perform operations comprising:
selecting a unit of a block of data;
indexing into a state table using the selected unit;
determining whether a decision regarding the block of data can be reached based on the indexed entry;
selecting a next state table indicated by the indexed entry if the decision regarding the block of data cannot be reached, wherein the block of data comprises a tag and each unit of the tag comprises a byte; and
intercepting packets being transmitted on a network, the packets associated with a document that includes intercepted objects, wherein the document is captured based on a particular capture rule associated with the intercepted objects, and wherein the tag comprises a data structure containing meta-data associated with a particular intercepted object, and wherein the document is stored in response to traversing the state table to parse the tag and match the tag to the particular capture rule.

22. The non-transitory machine-readable medium of claim 21, wherein the instructions further cause the processor to select a next unit of the block of data if the decision regarding the block of data cannot be reached.

23. The non-transitory machine-readable medium of claim 22, wherein the instructions further cause the processor to iteratively repeat indexing into the next state table using the next unit, determining whether the decision regarding the block of data can be reached based
on the indexed entry, and selecting another next state table indicated by the indexed entry if the decision regarding the block of data cannot be reached, until the decision regarding the block of data is reached.

24. The non-transitory machine-readable medium of claim 22, wherein selecting the next unit the block of data is based on a forward/reverse operator indicated by the indexed entry.

* * * * *